United States Patent
Hart et al.

[11] 4,018,313
[45] Apr. 19, 1977

[54] VEHICLE BRAKE WEDGE ACTUATOR ASSEMBLIES

[75] Inventors: John Hart, Solihull; Clifford John Pride, Lapworth, both of England

[73] Assignee: Girling Limited, Birmingham, England

[22] Filed: June 18, 1975

[21] Appl. No.: 587,841

[30] Foreign Application Priority Data

June 18, 1974 United Kingdom ............ 26852/74

[52] U.S. Cl. .............................................. 188/343
[51] Int. Cl.² ........................................ F16D 51/62
[58] Field of Search ......... 188/343, 368, 364, 326, 188/325, 78, 72.7, 361, 366; 74/110

[56] References Cited

UNITED STATES PATENTS

| | | | |
|---|---|---|---|
| 3,302,473 | 2/1967 | Lowry et al. | 188/364 X |
| 3,388,606 | 6/1968 | Hill | 188/343 X |
| 3,425,518 | 2/1969 | Morrow | 188/366 X |
| 3,511,103 | 5/1970 | Cox, Jr. | 188/343 |
| 3,535,944 | 10/1970 | Newstead | 188/343 |
| 3,599,763 | 8/1971 | Bailey | 188/343 X |
| 3,647,034 | 3/1972 | Wieger | 188/343 |

FOREIGN PATENTS OR APPLICATIONS 530,997 12/1940 United Kingdom ............ 188/368

*Primary Examiner*—Trygve M. Blix
*Assistant Examiner*—Douglas C. Butler
*Attorney, Agent, or Firm*—Scrivener Parker Scrivener and Clarke

[57] ABSTRACT

In a wedge type actuator assembly in which the cage assembly in which the rollers are captive is not captive to the wedge member, an aperture in the housing through which the cage assembly is inserted during assembly of the actuator is shaped to allow insertion of the cage assembly only when it is correctly orientated with respect to the housing. A washer provided with a shaped aperture to receive the wedge member is keyed against rotation in a circular aperture in the housing and the washer ensures that the wedge member cannot be inserted into the housing when it is misorientated by 90° about its axis of movement.

8 Claims, 8 Drawing Figures

VEHICLE BRAKE WEDGE ACTUATOR ASSEMBLIES

SPECIFIC DESCRIPTION

This invention relates to an actuator assembly for vehicle brakes of the kind comprising a housing in which a wedge member is displaceable to urge two follower members substantially in opposite directions to apply friction means into braking engagement with a rotor, the follower members being formed with surfaces inclined to each other and arranged one on each side of the wedge member, at least one roller being interposed between each of said surfaces and the cooperating surface of the wedge member, and the rollers being retained in a cage.

In actuators of this kind the angular movement of the cage to accommodate roller movement during operation is difficult ot achieve unless the cage assembly, comprising the cage and rollers, is mounted separately from the wedge.

It is important that during initial assembly or servicing of such actuator assemblies that the cage is inserted into the housing in the correct orientation, and is not displaced through 90° about the axis of movement of the wedge member.

According to one feature of the invention an actuator assembly for a vehicle brake comprises a housing provided with an internal cavity intersected by a through-bore, a wedge member linearly movable in said cavity of the housing and formed with wedge surfaces, two follower members displaceable in said bore in opposite directions away from said cavity in response to movement of said wedge member for applying friction means into braking engagement with a rotor, said follower members being formed with surfaces inclined to each other and arranged one on each side of said wedge member, at least one roller interposed between each of said inclined surfaces and a respective one of said wedge surfaces, and a cage in which said rollers are retained as a cage assembly in said cavity and not captive to said wedge member, wherein said housing is provided with guide surfaces defining a passage of asymmetrical cross-section extending from the exterior of said housing to said cavity, and the cage assembly is of cross-sectional shape complementary to that of the passage, whereby during assembly of the actuator assembly insertion of the cage assembly through said passage and into position in said cavity is permitted only when said cage assembly is correctly orientated angularly about the axis of said passage.

Preferably the housing is machined with an oblong rectangular aperture and the cage assembly is of a complementary shape to prevent misorientation of the cage by 90°.

The shaped aperture may be formed in the opposite side of the housing to an aperture in the housing through which the wedge member operates, to enable the cage assembly to be removed from the housing without removal of the wedge member.

In another preferred construction the cage assembly is inserted into the housing through one of the openings in which a follower member normally works, and that opening is shaped to prevent misorientation of the cage assembly.

It is also important in actuators of the above kind that the wedge member should not be assembled into the housing when it is misorientated about its axis by 90°.

Often the wedge member is formed with a pair of opposed parallel faces which would contact the rollers if the wedge member were to be misorientated by 90° so that the actuator would then be inoperative. This would clearly be dangerous.

According to another feature of the invention an actuator assembly for a vehicle brake comprises a housing, a wedge member linearly movable in the housing and formed with wedge surfaces, two follower members displaceable in the housing in opposite directions in response to movement of said wedge member for applying friction means into braking engagement with a rotor, said follower members being formed with surfaces inclined to each other and arranged one on each side of said wedge member, at least one roller interposed between each of said inclined surfaces and a respective one of said wedge surfaces, and a cage in which said rollers are retained as a cage assembly not captive to said wedge member, wherein said housing is provided with means defining an asymmetrical aperture through which said wedge member is inserted during assembly of the wedge member into the actuator housing, said wedge member having a larger end of which the transverse cross-sectional shape is complementary to that of said aperture, whereby insertion of said wedge member into the housing is prevented by baulking between said means and said wedge member when said wedge member is angularly misorientated about its axis of linear movement.

Preferably the shaped aperture is formed in an abutment member which is keyed against rotation in a circular aperture formed in the housing and is prevented from moving inwardly by a stop in the housing.

An actuator assembly in accordance with our invention will now be described with reference to the accompanying drawings in which:

FIG. 8 is a section on the line 5—5 of FIG. 2 showing how the washer is keyed against rotation in the housing.

Figure 1:
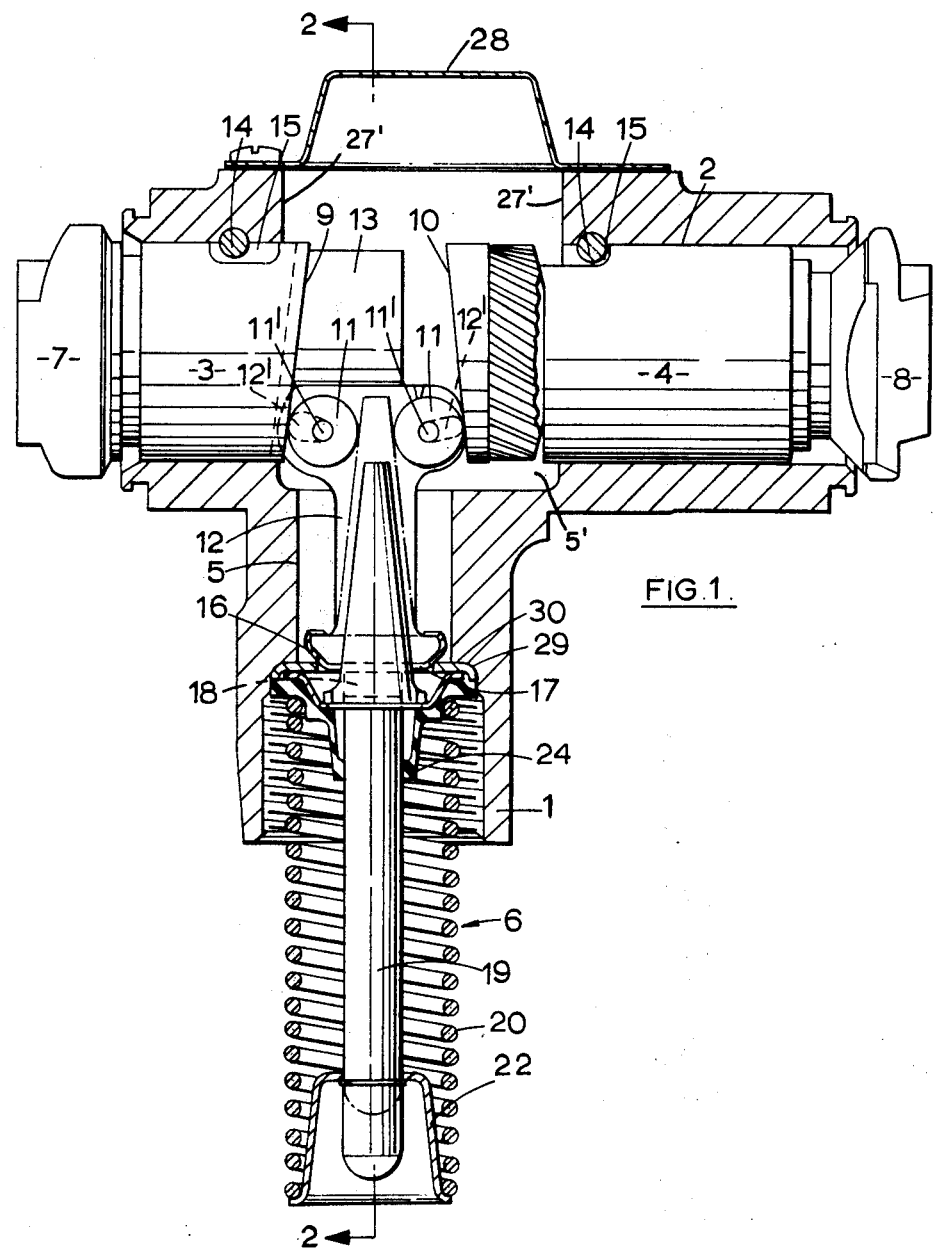
FIG. 1 is a cross-sectional view of the actuator assembly when correctly assembled and showing in chain dotted outline the position of the wedge member when an air chamber, not shown, has been fitted to the assembly for actuating the wedge member.

Referring to FIG. 1, a cast housing 1 is formed with a longitudinal through-bore 2 in opposite ends of which work two follower members in the form of plungers 3 and 4 and with a transverse stepped bore 5 through which operates a wedge assembly 6. The bore 5 leads into a chamber 5' intersected by the bore 2.

The plungers 3 and 4 are adapted at their outer ends 7 and 8 to engage with the ends of shoes, not shown, of an internal shoe drum brake and are formed at their inner ends respectively with inclined surfaces 9 and 10 for engagement by rollers 11 carried in a cage 12.

The inner end of the plunger 3 is formed with two parallel projections 13 which define a slot for guiding the cage assembly 11 and 12, and the plungers 3 and 4 are prevented from rotating and their axial movement in bore 2 is limited by pins 14 co-operating with grooves 15 in the plungers.

The cage is formed with a mushroom-shaped head 16 having a central aperture 17 through which works wedge member 18 of the wedge assembly 6. The head 16 engages with plungers 3 and 4 when the plungers are at their maximum separation to restrict the travel of the cage and so prevent the rollers 11 from becoming displaced from between the inclined faces 9 and 10. This feature forms the subject of our copending U.S. Pat. application No. 578,930 filed May 14th 1975.

Figure 3:
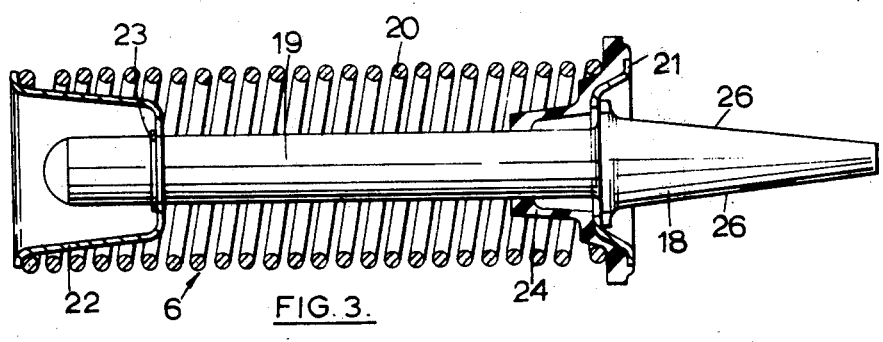
FIG. 3 is a longitudinal cross-section of the self-contained wedge assembly.
Figure 4:
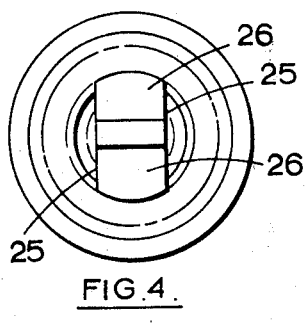
FIG. 4 is an end view of the wedge assembly of FIG. 3.

Reduced ends 11' of the rollers are journalled in elongate holes 12' in the cage 12, this feature forming the subject of our published U.K Pat. specification No. 1,425,324.

the wedge assembly 6 is self-contained and, as shown in FIGS. 3 and 4, comprises the wedge member 18 provided with an integral push rod 19, and a compression spring 20 caged between a first cup 21 and a second cup 22 retained in position on the push rod 19 by a circlip 23. A dust excluder 24 is held against cup 21 by the spring 20.

The wedge member 18 has parallel side walls 25 and inclined walls 26 for engagement with rollers 11.

When the actuator is correctly assembled, each roller 11 is in contact with one of the inclined faces 9 or 10 of the plungers and with the adjacent inclined wall 26 of the wedge member 18 so that when the push-rod is urged inwardly by suitable means against the force of spring 20 the wedge member 18 acts through the rollers 11 to urge the plungers 7 and 8 outwardly of the housing in opposite direction to apply the brake shoes (not shown) to a brake drum (not shown). The wedge member 18 and the cage 12 work in a cavity of the housing constituted by the chamber 5' and the bore 5.

The housing 1 is machined with an oblong rectangular opening 27 defined by four guide surfaces 27' and through which the cage assembly 11,12 can be inserted into a working position in the housing 1 before a cover 28 is fixed in position. The guide surfaces 27' extend from the exterior of the housing to the chamber 5'. The width A, shown in FIG. 2, of the opening 27 is so chosen that the cage assembly cannot be inserted into the opening 27 when it is misorientated by 90°about the axis of the push rod 19.

An abutment washer 29 seated against a stop in the form of a step 30 in the bore 5 is provided with a generally oblong rectangular aperture 31 which permits insertion of the wedge member to a working position in the housing only when the wedge member is correctly orientated.

Figure 5:
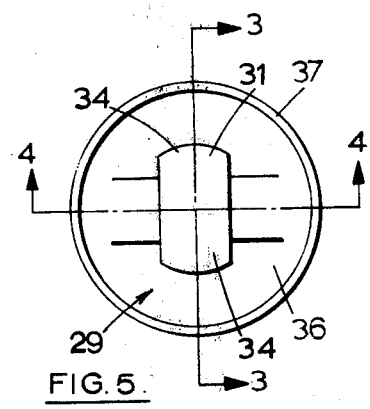
FIG. 5 is a plan view of the abutment washer showing the generally oblong rectangular aperture defined by the washer.
Figure 6:
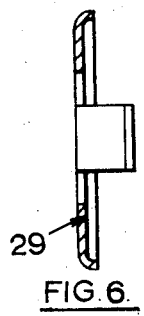
FIG. 6 is a cross-section of the washer on the line 3—3 of FIG. 5.
Figure 7:
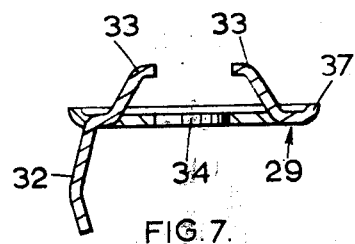
FIG. 7 is a further cross-section of the washer on the line 4—4 of FIG. 5.

Referring to FIGS. 5 to 7 the washer 29 comprises a plate 36 with an upturned edge 37 and a downturned resilient tag 32. A pair of cranked arms 33 are pressed upwardly from the plate 36 and the remainder of the center of the plate is removed at 34 so as to define the oblong rectangular aperture 31 when the washer is viewed in plan as in FIG. 5.

Figure 2:
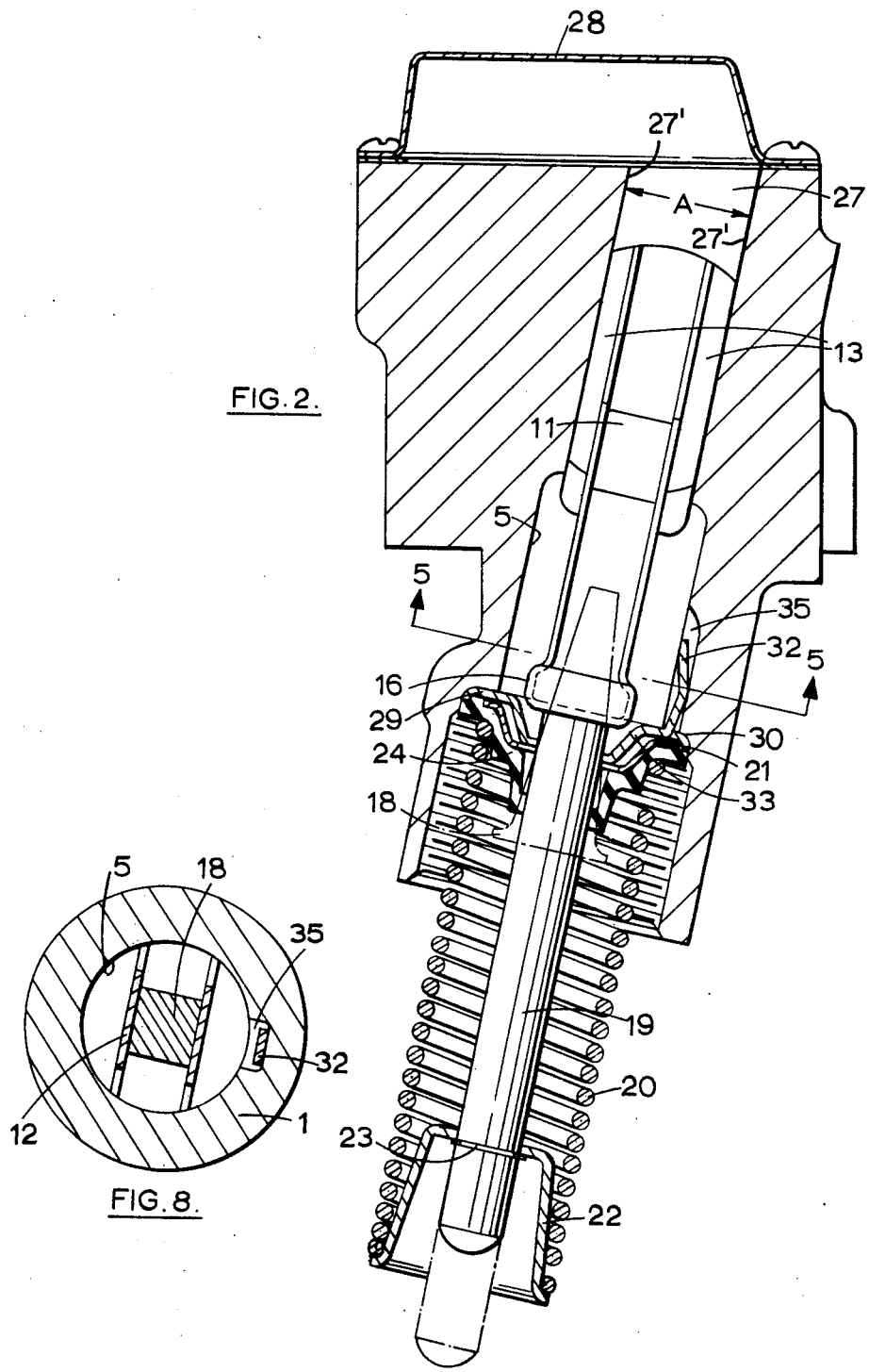
FIG. 2 is a section on the line 2—2 of FIG. 1 showing in chain dotted outline the innermost position of the wedge member that is allowed by the abutment washer when the wedge member is misorientated by 90° about its axis.

The tag 32 of the washer 29 is received, as shown in FIGS. 2 and 8, in an axial groove 35 in the bore 5 to key the washer against rotation in the bore, the resilience of the tag holding the washer in place during servicing.

If an attempt is made to insert the wedge member 18 into the bore 5 when it is misorientated about its axis by 90° then the inclined faces 26 of the wedge member will come into engagement with the free ends of the arms 33 of the washer and prevent the wedge member and push rod from being inserted further into the housing than the position shown in chain dotted outline in FIG. 2.

The outer end of the push rod 19 then projects sufficiently far from the housing to prevent an air chamber, not shown, from being assembled to the housing for actuation of the wedge member.

We claim:

1. An actuator assembly for a vehicle brake comprising a housing provided with an internal cavity intersected by a through-bore, a wedge member linearly movable in said cavity of the housing and formed with wedge surfaces, two follower members displaceable in said bore in opposite directions away from said cavity in response to movement of said wedge member for applying friction means into braking engagement with a rotor, said follower members being formed with surfaces inclined to each other and arranged one on each side of said wedge member, at least one roller interposed between each of said inclined surfaces and a respective one of said wedge surfaces, and a cage in which said rollers are retained as a cage assembly in said cavity and not captive to said wedge member, wherein said housing is provided with guide surfaces defining a passage of asymmetrical cross-section extending from the exterior of said housing to said cavity, and the cage assembly is of a cross-sectional shape complementary to that of the passage, whereby during assembly of the actuator assembly insertion of the cage assembly through said passage and into position in said cavity is permitted only when said cage assembly is correctly orientated angularly about the axis of said passage.

2. An actuator assembly as in claim 1 wherein said guide surfaces define the cross-sectional shape of said passage to be oblong rectangular.

3. An actuator assembly as in claim 1, and including an actuating member for said wedge member, said housing being formed with an aperture in the opposite side of the housing to said passage, and said actuating member protruding through said aperture.

4. An actuator assembly for a vehicle brake comprising a housing, a wedge member linearly movable in the housing and formed with wedge surfaces, two follower members displaceable in the housing in opposite directions in response to movement of said wedge member for applying friction means into braking engagement with a rotor, said follower members being formed with surfaces inclined to each other and arranged one on each side of said wedge member, at least one roller interposed between each of said inclined surfaces and a respective one of said wedge surfaces, and a cage in which said rollers are retained as a cage assembly not captive to said wedge member, wherein said housing is provided with means defining an asymmetrical aperture through which said wedge member is inserted during assembly of the wedge member into the actuator housing, said wedge member having a larger end of which the transverse cross-sectional shape is complementary to that of said aperture, whereby insertion of said wedge member into the housing is prevented by baulking between said means and said wedge member when said wedge member is angularly misorientated about its axis of linear movement.

5. An actuator assembly as in claim 4, wherein said housing is provided with a circular aperture, and herein said means defining an asymmetrical aperture comprises a circular washer located in said aperture, said housing being provided with stop means engaged by said abutment member for limiting its movement inwardly of the housing, and including key means for keying said washer against rotation relative to said housing.

6. An actuator assembly as in claim 5 wherein said key means comprises a projection on said washer and a recess in said housing with which said projection engages.

7. An actuator assembly as in claim 6, in which said projection is formed of resilient material for holding the washer in position in the housing during servicing of the actuator.

8. An actuator as in claim 5 wherein said circular washer includes a pair of cranked arms having free ends which are directed towards each other and which define in part said asymetrical aperture.

* * * * *